United States Patent
Knauff et al.

(10) Patent No.: US 6,768,238 B2
(45) Date of Patent: Jul. 27, 2004

(54) ROTOR FOR A PERMANENT MAGNET SYNCHRONOUS MACHINE

(75) Inventors: Axel Knauff, Münnerstadt (DE); Rolf Vollmer, Gersfeld (DE)

(73) Assignee: Siemens Aktiengesellschaft, Müchen (DE)

(*) Notice: Subject to any disclaimer, the term of this patent is extended or adjusted under 35 U.S.C. 154(b) by 0 days.

(21) Appl. No.: 10/285,392

(22) Filed: Oct. 31, 2002

(65) Prior Publication Data

US 2003/0173853 A1 Sep. 18, 2003

(30) Foreign Application Priority Data

Oct. 31, 2001 (DE) .......................................... 101 53 750

(51) Int. Cl.$^7$ .............................................. H02K 21/12
(52) U.S. Cl. .......................... 310/156.56; 310/156.53; 310/156.57; 310/156.55
(58) Field of Search ....................... 310/156.55, 156.56, 310/156.57, 156.58, 156.59, 156.6, 156.61, 254

(56) References Cited

U.S. PATENT DOCUMENTS

| | | | | |
|---|---|---|---|---|
| 4,327,302 A | * | 4/1982 | Hershberger | ........... 310/156.56 |
| 4,445,062 A | | 4/1984 | Glaser | |
| 4,806,717 A | * | 2/1989 | Hershberger | ........... 310/156.56 |
| 5,463,262 A | * | 10/1995 | Uchida | ................... 310/156.61 |
| 6,437,473 B1 | * | 8/2002 | Mobius et al. | ......... 310/156.21 |

FOREIGN PATENT DOCUMENTS

| | | |
|---|---|---|
| DE | 135 955 | 6/1979 |
| DE | 197 23 302 A1 | 12/1998 |
| EP | 0 803 962 A1 | 10/1997 |
| EP | 0 872 944 | 10/1998 |
| JP | 2000156946 A | 6/2000 |

* cited by examiner

Primary Examiner—Burton S. Mullins
Assistant Examiner—Yahveh Comas
(74) Attorney, Agent, or Firm—Henry M. Feiereisen

(57) ABSTRACT

A rotor for permanent magnet synchronous machines with a reduction in the stray flux transmitted through the rotor shaft includes substantially ring-shaped punched sheet metal plates with a central opening for receiving the rotor shaft, and a plurality of recesses arranged in the circumferential direction, wherein at least two permanent magnets can be inserted in each of the recesses. A corresponding intermediate sheet metal segment is arranged or can be arranged in each of the recesses between the permanent magnets. At least one of the recesses is shaped so as to form an air gap between the surface of the intermediate sheet metal segment that is oriented radially inwardly towards the center and an edge of the recess that is oriented radially outwardly from the center, when the permanent magnets are inserted radially towards the outside. The air gap aids in attenuating the stray flux.

14 Claims, 5 Drawing Sheets

ROTOR FOR A PERMANENT MAGNET SYNCHRONOUS MACHINE

CROSS-REFERENCES TO RELATED APPLICATIONS

This application claims the priority of German Patent Application Serial No. 101 53 750.6, filed Oct. 31, 2001, pursuant to 35 U.S.C. 119(a)–(d), the disclosure of which is incorporated herein by reference.

BACKGROUND OF THE INVENTION

The present invention relates to a rotor for an electric machine, in particular a permanent magnet (PM) synchronous machine. More particularly, the present invention relates to a punched sheet metal unit for electrical machines with a substantially ring-shaped punched metal plate, which has its center an opening for receiving a shaft, and a plurality of recesses arranged along the periphery of the metal plate, wherein one or more corresponding permanent magnets can be inserted in the recesses.

The permanent magnets in a rotor of asynchronous machines excited with permanent magnets are embedded radially in the rotor iron. The permanent magnets can be arranged in a flux concentration arrangement and magnetized alternatingly with different tangential magnetization directions. A rotor of this type is described in EP 0 803 962 A1. The punched sheet metal packet of the rotor described therein has an opening for receiving a holding element in the form of a hollow cylinder. This holding element secures the permanent magnets in the gaps of the sheet metal packet and should be made of a non-magnetic material to avoid stray flux. The sheet metal packet is held with screws between two coupling flanges to ensure its stability. The bolts and/or screws extend through both coupling flanges as well as through the sheet metal packet.

Rotors with permanent magnets implemented in a flux-concentrating design have a fundamental problem in that stray flux $\Phi_s$ can propagate through the shaft. The stray flux $\Phi_s$ can be reduced by employing non-magnetic materials, air gaps or easily saturable, thin soft-magnetic junction elements between the permanent magnet and the shaft. However, such arrangements disadvantageously either use expensive materials and have a complex design, or still exhibit a residual, potentially significant stray flux.

It would therefore be desirable and advantageous to provide an improved rotor for a permanent magnet synchronous machine to obviate prior art shortcomings and to minimize the stray flux transmitted through the shaft while retaining a simple design of the sheet metal packet.

SUMMARY OF THE INVENTION

According to one aspect of the invention, a punched sheet metal unit for electrical machines with a substantially ring-shaped punched metal plate has in its center an opening for receiving a shaft, and a plurality of recesses arranged in the circumferential direction, wherein at least two permanent magnets can be inserted in each of the recesses. A corresponding intermediate sheet metal segment is arranged or can be arranged in each of the recesses between the permanent magnets. At least one of the recesses is shaped so as to form an air gap between the surface of the intermediate sheet metal segment that is oriented radially inwardly towards the center and an edge of the recess that is oriented radially outwardly from the center, when the permanent magnets are inserted radially towards the outside.

According to another aspect of the invention, a punched sheet metal module includes a plurality of connected punched sheet metal units sequentially arranged in an axial direction, with the punched sheet metal units including a substantially ring-shaped punched metal plate having a central opening adapted to receive a shaft, a plurality of recesses formed in the metal plate and arranged in a circumferential direction of the metal plate, each of said recesses adapted to receive at least two permanent magnets, and an intermediate sheet metal segment arranged between the at least two permanent magnets. The intermediate sheet metal segment has a peripheral edge and an inward edge facing the opening, wherein an air gap is formed between the inward edge of the intermediate sheet metal segment and an edge of the recess proximate to the opening when the at least two permanent magnets are inserted in such a way as to contact the respective recesses.

Embodiments of the invention may include one or more of the following features. The air gap in at least one of the recesses can abut surfaces of the at least two permanent magnets that are oriented towards the opening. The intermediate sheet metal segments can be connected in a peripheral region of the punched sheet metal and also formed as one piece with the punched sheet metal. Additionally employed separation sheet metal segments which can be formed as one piece with the punched sheet metal can be provided to separate the recesses from each other. The separation sheet metal segments can be connected with adjacent intermediate sheet metal segments in a peripheral region of the punched metal plate.

Advantageously, at least one of the recesses can be open at a peripheral edge of the metal plate and at least one of the separation sheet metal segments can have at least one tangentially arranged nose formed proximate to the peripheral edge of the metal plate, wherein the nose can hold at least one of the permanent magnets disposed in a recess. The permanent magnets can also be held in place by providing the intermediate sheet metal segments on their inward edges with tangentially formed noses. Alternatively, to prevent the intermediate sheet metal segments and/or the permanent magnets from being ejected by the centrifugal force, at least one holding element can be disposed in a corresponding recess and configured to hold the at least two permanent magnets in the recess in a predetermined position. The holding element can be secured by providing mounting recesses in the inward edge of the intermediate sheet metal segment and in the edge of the recess proximate to the opening, wherein the mounting recesses can engage with the holding element. To minimize the stray flux, the holding element can be made of a non-magnetic material, such as aluminum, an aluminum alloy, brass, non-magnetic stainless steel and plastics.

The punched sheet metal units of the punched sheet metal module can be connected with each other by one or more bolts extending through the punched sheet metal units, an/or by impregnating, potting and/or gluing.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
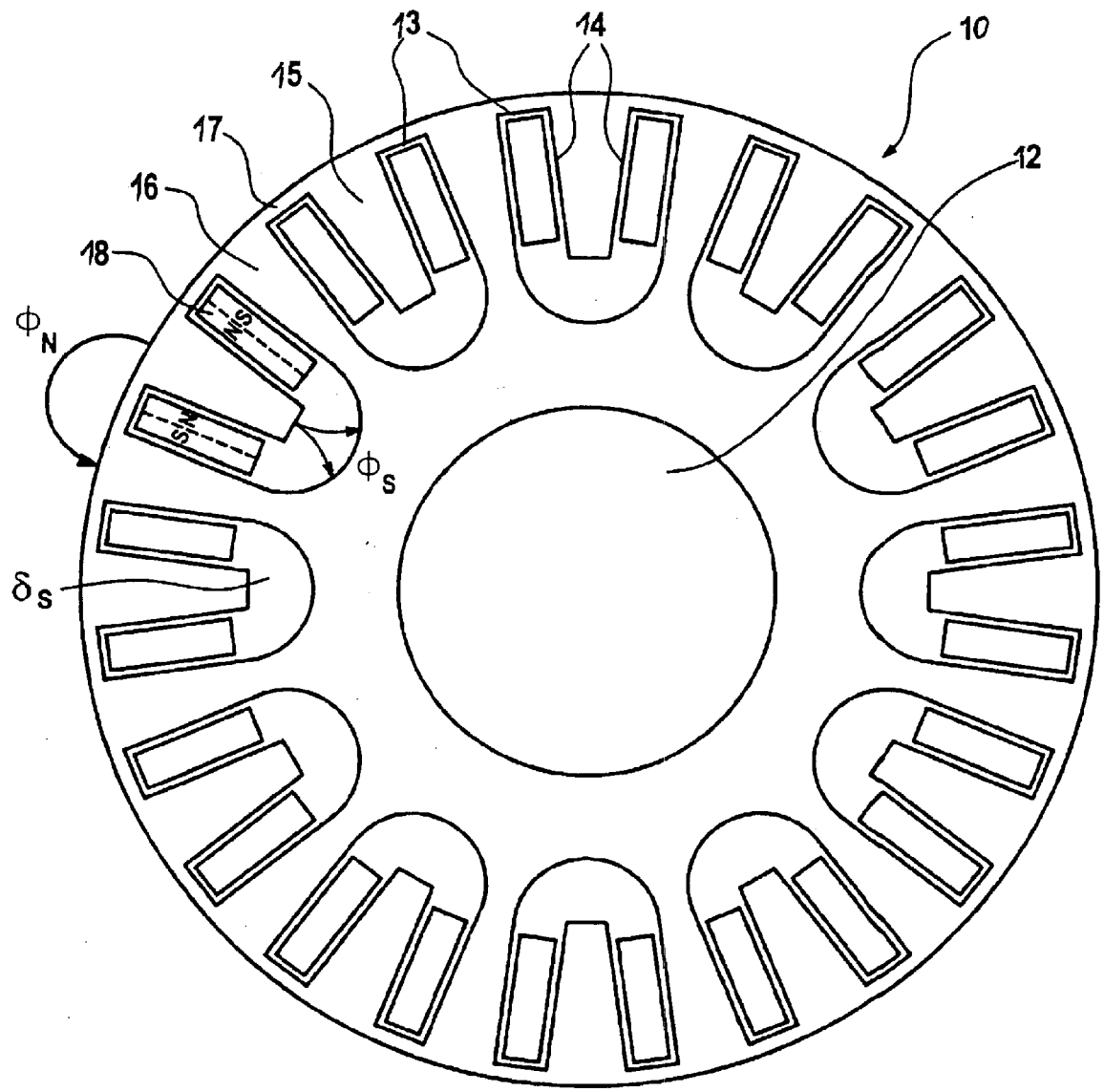
FIG. 1 is a top view of a punched sheet metal unit according to a first embodiment of the present invention.

Throughout all the Figures, same or corresponding elements are generally indicated by same reference numerals.

Turning now to the drawing, and in particular to FIG. 1, there is shown a top view of a punched sheet metal plate 10 according to a first embodiment of the present invention. The punched sheet metal plate 10 includes a center opening 12 adapted for insertion of a rotor shaft. The ring-shaped punched sheet metal plate 10 also has U-shaped punched out sections and/or recesses 13 arranged on a circle. The legs 14 of the recesses 13 extend radially outwardly. Punched-out tongues or intermediate sheet metal segments 15 are formed between the legs 14 of each recess 13. Sheet metal segments which will be referred to hereinafter as separation sheet metal segments 16, are disposed between every other recess 13. The legs 14 of the recesses 13 do not extend to the outer peripheral edge of the punched sheet metal plate 10, leaving a connecting web 17 at the head of each leg, which connects an intermediate sheet metal segment 15 with a separation sheet metal segment 16.

FIG. 1 also indicates the configuration of the permanent magnets 18 inserted in each leg of the U-shaped recesses 13. The North poles of the permanent magnets disposed in the legs of the same recess 13 face each other. This produces a stray flux $\Phi_s$ extending from the tip of the intermediate sheet metal segment 15 to the interior section of the ring-shaped punched sheet metal plate 10. The stray flux $\Phi_s$ is attenuated significantly since it has to bridge the air gap $\delta_s$ between the tip of the intermediate sheet metal segments 15 and the interior section of the punched sheet metal plate 10. The useful flux $\Phi_N$, on the other hand, can optimally exit and reenter at the outer circumference of the rotor in the radial direction, since both the intermediate sheet metal segments 15 and the separation sheet metal segments 16 are oriented in the radial direction.

Figure 2:
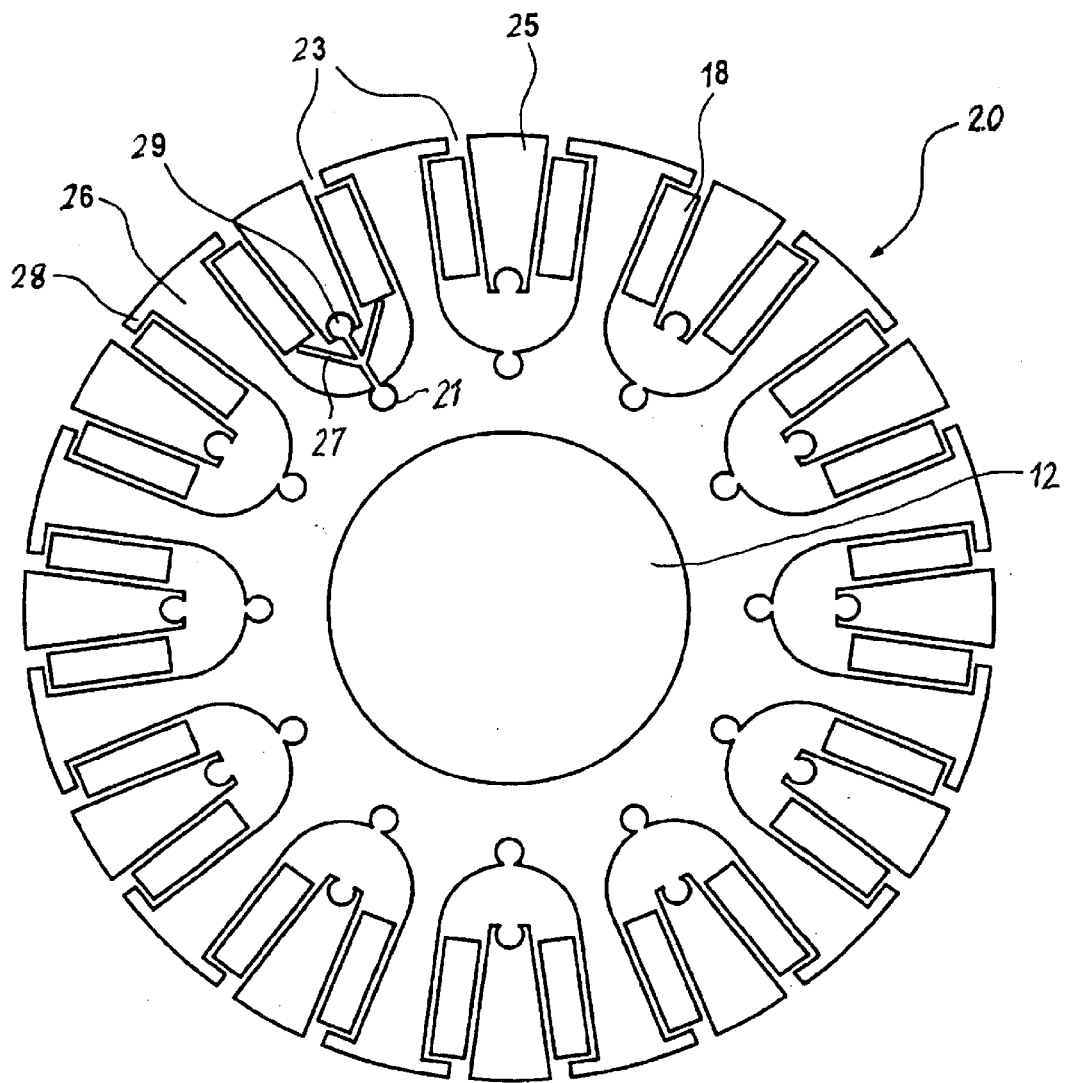
FIG. 2 is a top view of a punched sheet metal unit according to a second embodiment of the present invention.

FIG. 2 shows a second embodiment of the present invention, wherein the recesses 23 are open in the radially outward direction. This exemplary configuration shows the permanent magnets 18 as also being mounted in the recesses 23.

Unlike in the first embodiment of FIG. 1, where the intermediate sheet metal segments 15 were connected tangentially with a corresponding adjacent separation sheet metal segment 16 by a connecting web 17, the intermediate sheet metal segments 25 are in the embodiment depicted in FIG. 2 not an integral part of the punched sheet metal plate 20. A holding element 29 secures each installed intermediate sheet metal segment 25 against the centrifugal force. For example, the holding element 29 can engage with a punched-out section disposed in the end face of the intermediate sheet metal segment 25 facing the center and with a punched-out section 21 disposed in the metal plate 20 on the section of the recesses 23 proximate the opening 12. The engagement between the ends of the holding element 29, which can have a circular cross-section, and the circular recesses on the intermediate sheet metal segment 25 and the punched sheet metal plate 20 produces a force-transmitting connection.

The permanent magnets 18 are secured against the centrifugal force by tangential noses 28 arranged on both sides of each separation sheet metal segment 26 proximate to the outer periphery of the punched sheet metal plate 20. The permanent magnets 18 can also be secured in the centripetal direction by forming the holding element 29 with legs 27 which secure the permanent magnets 18 radially in each recess 23.

Figure 4:
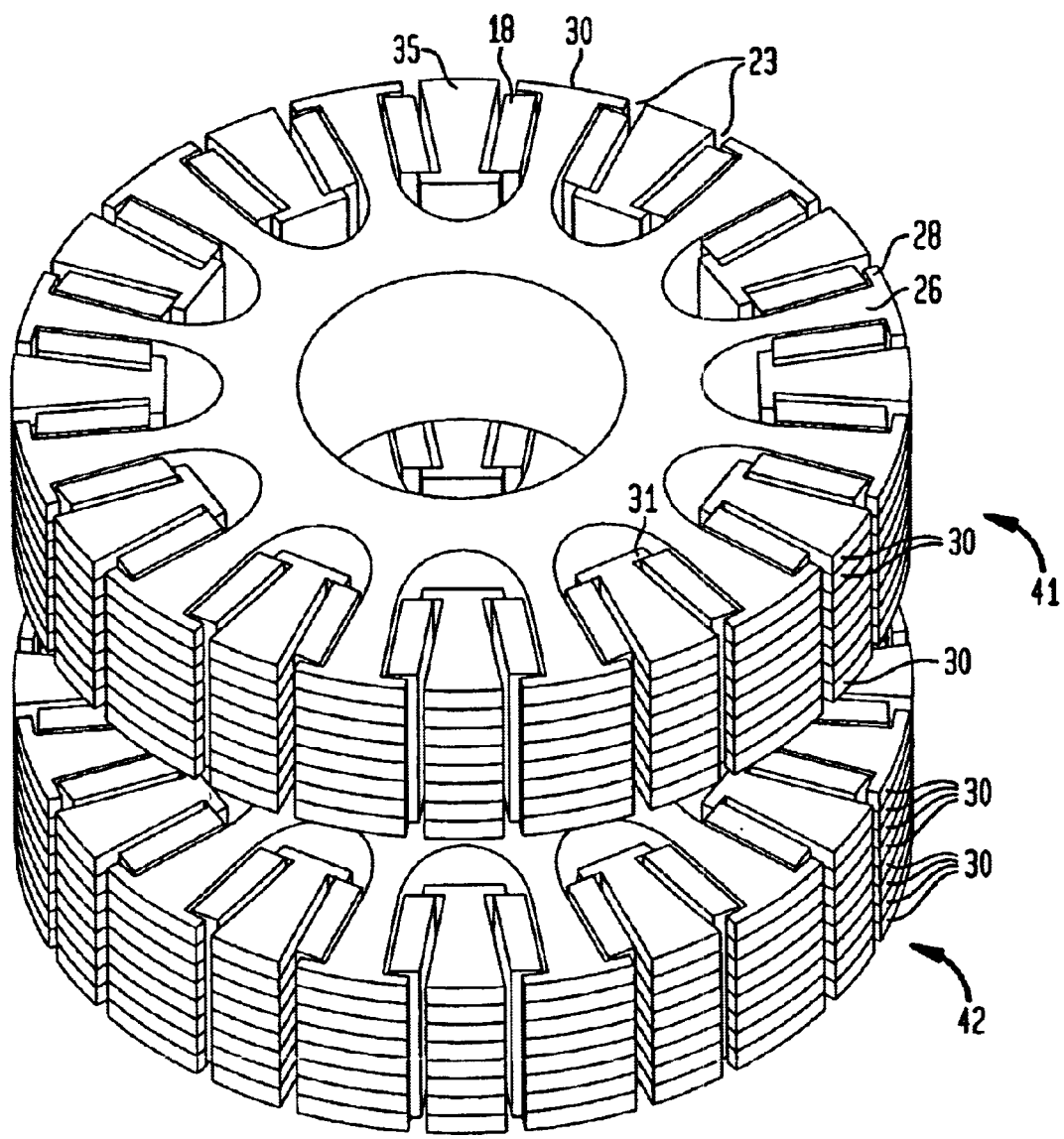
FIG. 4 is a perspective view of a sheet metal module with punched sheet metal units according to the third embodiment of the present invention.

The holding element 29 assists in the assembly of a rotor by holding the permanent magnets 18 in place with respect to the sheet metal packets when the sheet metal packets are stacked to a module, for example, the modules 41 and 42 depicted in FIG. 4. The holding elements 29 have the additional function of stabilizing the intermediate sheet metal segments of rotors operating at high rotation speeds.

Figure 3:
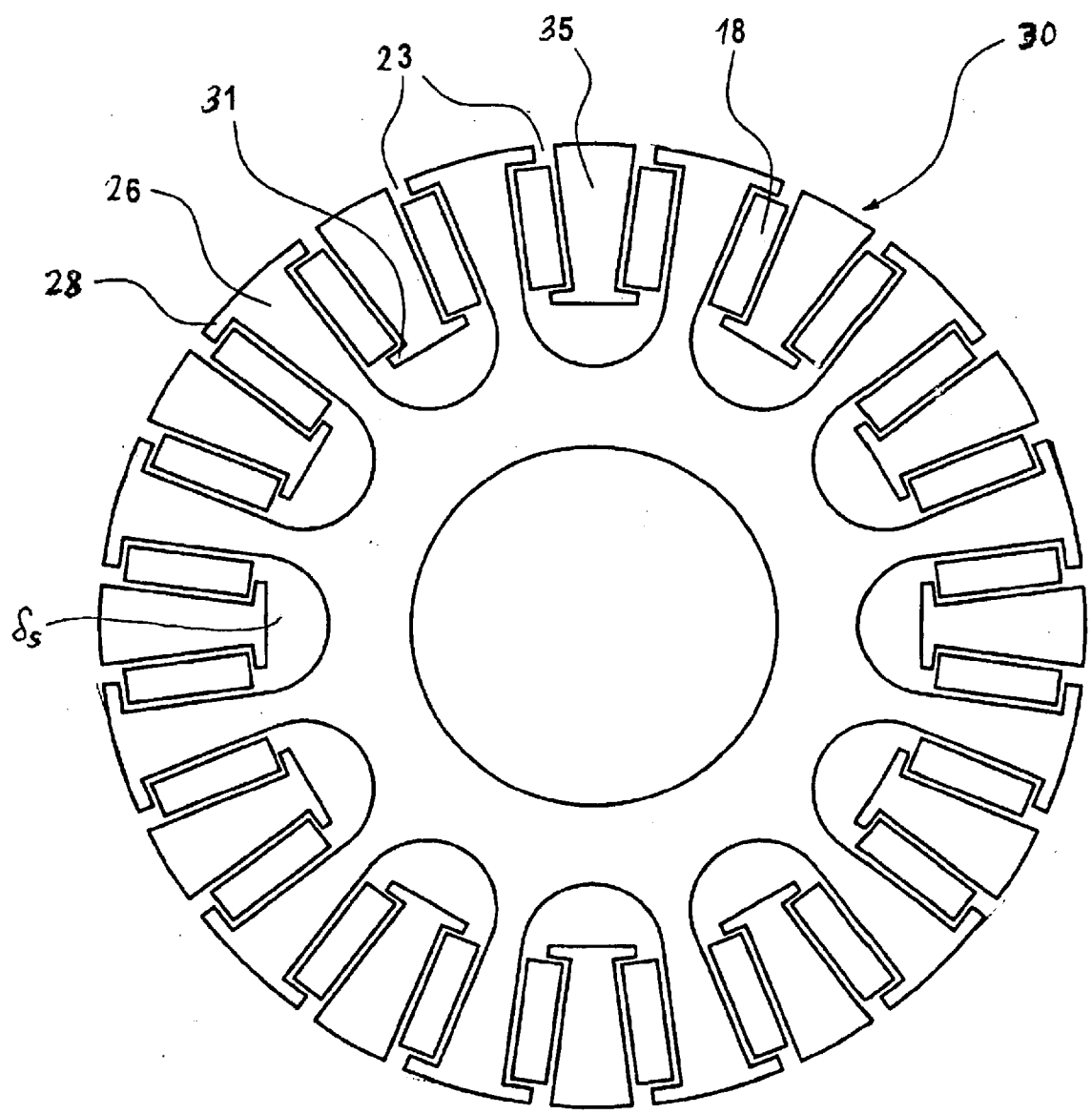
FIG. 3 is a top view of a punched sheet metal unit according to a third embodiment of the present invention.

FIG. 3 shows schematically in a top view a third embodiment of the present invention. Unlike the second embodiment, the third embodiment does not have recesses for the holding elements 29 in the punched sheet metal plate 30 are not required.

However, as in the second embodiment, the permanent magnets 18 in the third embodiment are secured against the centrifugal force by noses 28 formed on the separation sheet metal segments 26. The intermediate sheet metal segments 35 which are form-fittingly arranged in a recess 23 between the permanent magnets 18, also have tangentially oriented noses 31 on the side facing the center, which support the noses 31 on the permanent magnets 18 against the centrifugal force. This embodiment also includes the air gap $\delta_s$ of the invention located between the intermediate sheet metal segment 35 and the punched sheet metal plate 30, whereby the punched sheet metal plate 30 has a comparatively simple punched-out shape.

FIG. 4 is a schematic three-dimensional view of two exemplary sheet metal modules 41 and 42, each of which can be made of a stack of axially superpositioned punched sheet metal plates, such as the illustrated plates 30 according to the third embodiment, as well as installed permanent magnets 18 and intermediate sheet metal segments 35. However, any of the embodiments described above or a combination of plates 10, 20, 30 can be used. Such sheet metal modules can be applied with greater flexibility than rotor-specific sheet metal packets and are easier to assemble.

Figure 1A:
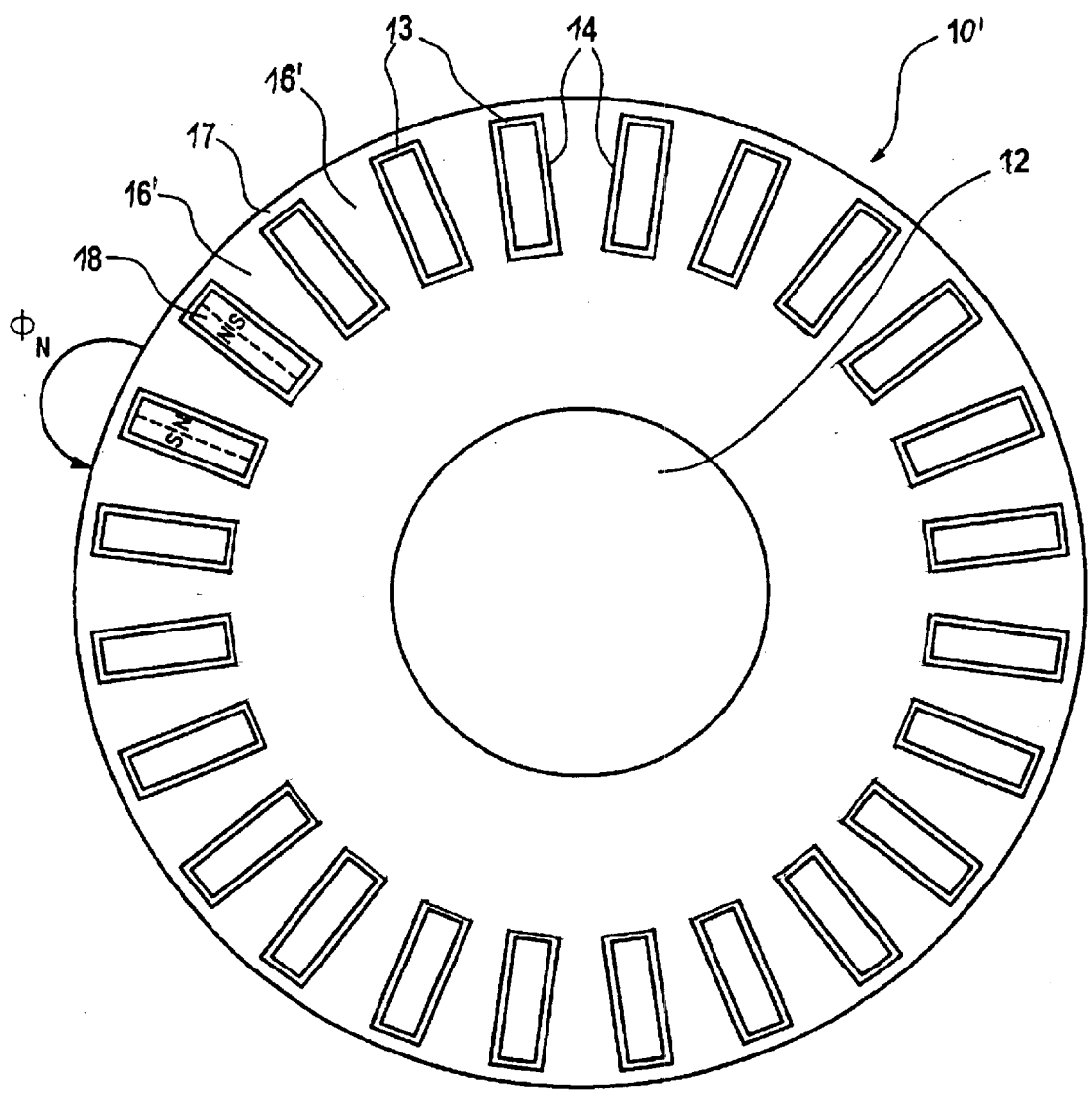
FIG. 1A is a top view of a punched sheet metal plate used to secure the magnets.

Referring back to FIGS. 1–3 and also to FIG. 1A, in yet another embodiment the arrangement of the sheet metal units 10 can be modified so that the intermediate sheet metal segments 15 and the separation sheet metal segments 16 are formed identically, for example periodically, on every $x^{th}$ metal sheet, such as every $5^{th}$ sheet. As shown in FIG. 1A, in this case a sheet metal plate 10' includes openings for the magnets 18 which are closed towards the center opening 12. Each of the at least two magnets 18 is separated by a separation sheet metal segment 16'. The small number of sheet metal plates 10' compared to the number of sheet metal units 10 will still be capable of supporting the permanent magnets in the centripetal direction, while the comparatively larger number of sheet metal units 10 with the air gap $\delta_s$ still keeps the stray flux $\Phi_s$ small.

A plurality of sheet metal modules can be stacked along the axial direction, wherein each sheet metal packet module can advantageously be rotated relative to an adjacent sheet metal packet module by a predetermined angle, as schematically indicated in FIG. 4. This produces over the axial length of the successive sheet metal modules a pole skew which can in turn reduce slot latching and an associated slot latching torque.

The aforedescribed modules 41, 42 can also be assembled, for example, by combining the punched sheet metal plates 10 depicted in FIG. 1 with the punched sheet metal plates 30 depicted in FIG. 3. This has the advantage that the permanent magnets 18 are secured against the centrifugal force without requiring the presence of noses 28 in the punched metal sheets 30 of FIG. 3.

While the invention has been illustrated and described in connection with currently preferred embodiments shown and described in detail it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents.

What is claimed is:

1. A punched sheet metal unit for electrical machines comprising
   a substantially ring-shaped punched sheet metal plate having a central opening adapted to receive a shaft;
   a plurality of recesses formed in the sheet metal plate and arranged in a circumferential direction of the sheet metal plate, each of said recesses adapted to receive at least two permanent magnets, at least one of the recesses being open at a peripheral edge of the sheet metal plate;
   an intermediate sheet metal segment arranged between the at least two permanent magnets, said intermediate sheet metal segment having a peripheral edge and an inward edge facing the opening;
   a plurality of separation sheet metal segments, which separate the recesses from each other and are formed as a single piece with the punched sheet metal plate, at least one of the separation sheet metal segments has at least one tangentially arranged nose formed proximate to the peripheral edge of the sheet metal plate, said nose adapted to secure at least one of the permanent magnets disposed in the at least one recess; and
   at least one holding element received in a corresponding recess and adapted to hold the at least two permanent magnets in the recess in a predetermined position,
   wherein an air gap is formed between the inward edge of the intermediate sheet metal segment and an edge of the recess proximate to the opening when the at least two permanent magnets are inserted so as to contact the respective recesses, and
   wherein a first mounting recess is provided on the inward edge of the intermediate sheet metal segment and a first second mounting recess is provided on the edge of the recess proximate to the opening, said first and second mounting recesses adapted for engagement with the holding element.

2. The punched sheet metal unit of claim 1, wherein the at least two permanent magnets includes surfaces facing the opening which abut the air gap in at least one of the recesses.

3. The punched sheet metal unit of claim 1, wherein the intermediate sheet metal segments are connected to the punched sheet metal plate in a peripheral region of the punched sheet metal plate.

4. The punched sheet metal unit of claim 3, wherein the intermediate sheet metal segments are formed as one piece with the punched sheet metal plate.

5. The punched sheet metal unit of claim 1, further comprising a plurality of separation sheet metal segments, which separate the recesses from each other and are formed as a single piece with the punched sheet metal plate.

6. The punched sheet metal unit of claim 5, wherein the separation sheet metal segments are connected with adjacent intermediate sheet metal segments in a peripheral region of the punched sheet metal plate.

7. The punched sheet metal unit of claim 5, wherein at least one of the recesses is open at a peripheral edge of the sheet metal plate, and wherein at least one of the separation sheet metal segments has at least one tangentially arranged nose formed proximate to the peripheral edge of the sheet metal plate, said nose adapted to secure at least one of the permanent magnets disposed in the at least one recess.

8. The punched sheet metal unit of claim 7, wherein the intermediate sheet metal segments include on their inward edges tangentially formed noses adapted to secure the permanent magnets.

9. The punched sheet metal unit of claim 1, wherein the holding element is made of a non-magnetic material.

10. The punched sheet metal unit of claim 9, wherein the non-magnetic material is selected from the group consisting of non-magnetic metals and plastics.

11. A punched sheet metal module having a plurality of connected punched sheet metal units sequentially arranged in an axial direction, the punched sheet metal units comprising:
    a substantially ring-shaped punched sheet metal plate having a central opening adapted to receive a shaft,
    a plurality of recesses formed in the sheet metal plate and arranged in a circumferential direction of the sheet metal plate, each of said recesses adapted to receive at least two permanent magnets,
    an intermediate sheet metal segment arranged between the at least two permanent magnets, said intermediate sheet metal segment having a peripheral edge and an inward edge facing the opening,
    wherein an air gap is formed between the inward edge of the intermediate sheet metal segment and an edge of the recess proximate to the opening when the at least two permanent magnets are inserted so as to contact the respective recesses,
    a separation sheet metal segment located between two of the plurality of recesses and connected to the ring-shaped punched sheet metal plate without a gap,
    wherein the intermediate sheet metal segments having the gap and the separation sheet metal segments without the gap are arranged periodically in an axial direction of the punched sheet metal module.

12. The punched sheet metal module of claim 11, wherein the punched sheet metal units are connected by at least one of impregnating and gluing.

13. The punched sheet metal module of claim 11, and further comprising substantially ring-shaped second punched sheet metal plates with a central opening adapted to receive the shaft, and a plurality of circumferentially arranged openings formed in the second punched sheet metal plates and adapted to receive the at least two permanent magnets, wherein the openings are aligned with the recesses in the punched sheet metal units and the second punched sheet metal plates are interposed between the sequentially arranged punched sheet metal units.

14. The punched sheet metal module of claim 13, wherein the predetermined number defines a periodic arrangement of the punched sheet metal units and the second punched sheet metal plates.

* * * * *

UNITED STATES PATENT AND TRADEMARK OFFICE
CERTIFICATE OF CORRECTION

PATENT NO. : 6,768,238 B2  
DATED : July 27, 2004  
INVENTOR(S) : Axel Knauff and Rolf Vollmer Page 1 of 1

It is certified that error appears in the above-identified patent and that said Letters Patent is hereby corrected as shown below:

<u>Column 5,</u>  
Line 54, delete "first"

Signed and Sealed this

Fifteenth Day of February, 2005

JON W. DUDAS  
*Director of the United States Patent and Trademark Office*